Feb. 21, 1956 M. RASPANTI 2,735,457
SCROLL SAW BLADE HOLDING MEANS
Filed Oct. 25, 1954 2 Sheets-Sheet 1
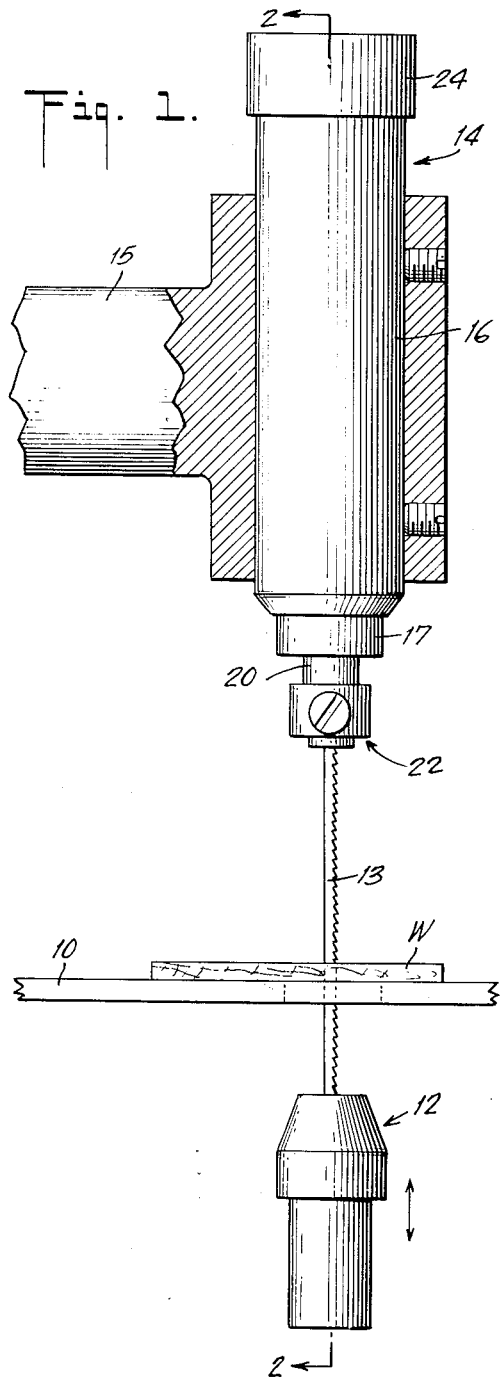
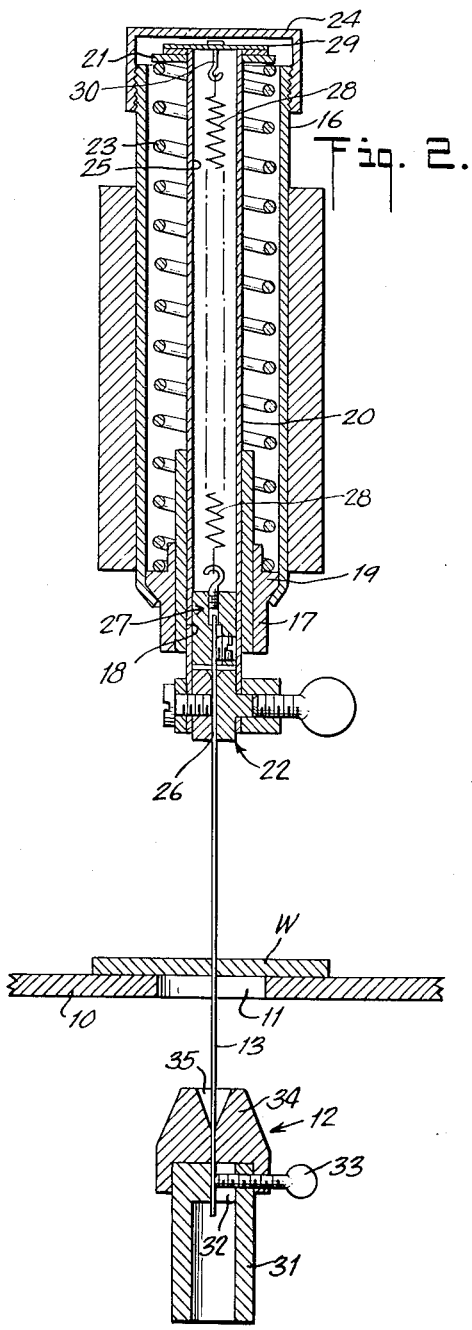
INVENTOR.
MATTHEW RASPANTI
BY
Leo C. Krazinski
ATTORNEY Feb. 21, 1956 M. RASPANTI 2,735,457
SCROLL SAW BLADE HOLDING MEANS
Filed Oct. 25, 1954 2 Sheets-Sheet 2
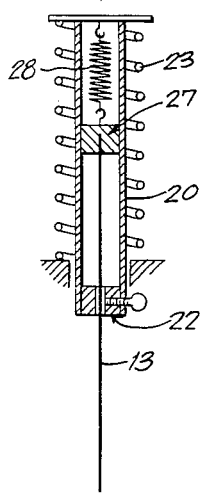
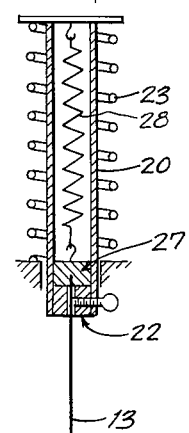
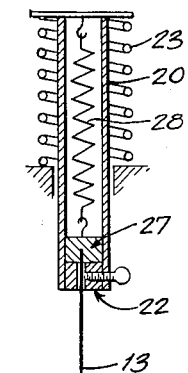
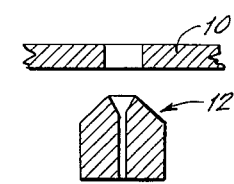
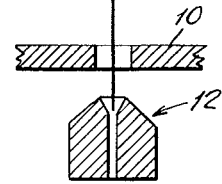
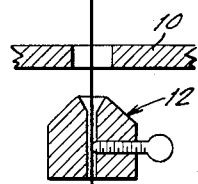
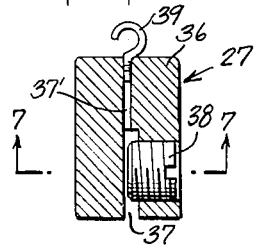
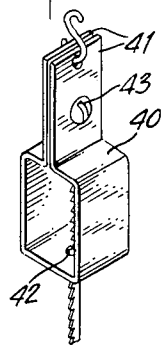
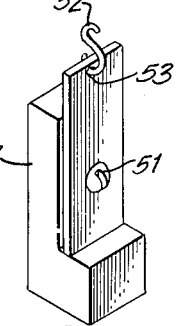
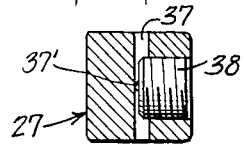
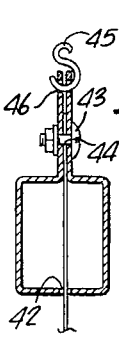
INVENTOR.
MATTHEW RASPANTI
BY
Leo C. Krazinski
ATTORNEY

United States Patent Office 2,735,457
Patented Feb. 21, 1956

2,735,457

SCROLL SAW BLADE HOLDING MEANS

Matthew Raspanti, Brooklyn, N. Y.

Application October 25, 1954, Serial No. 464,349

10 Claims. (Cl. 143—73)

The present invention relates to wood sawing machines of the reciprocating type and, more particularly, to improvements in scroll saws.

The present invention is primarily concerned with improving conventional scroll saws, such as that shown in Patent No. 1,964,651, which essentially comprise a work table formed with an opening through which a saw blade extends, a lower chuck below the table having the lower end of the saw blade secured thereto and operated by a drive to reciprocate the saw blade, an upper chuck above the table having the upper end of the saw blade secured thereto, and a tension sleeve including a plunger carrying the upper chuck and a spring normally urging the plunger upwardly to tension the saw blade and adapted to be compressed when the saw blade is pulled downwardly by the lower chuck.

One of the difficulties with such machines is that the saw blade must be disconnected from both the upper and lower chucks in making interior cuts. For example, at the end of a cut the drive is operated manually until the blade reaches its higher position to release some but not all of the tension on the blade. The upper chuck is untightened to release the blade and moves upwardly further with the plunger under the influence of the spring. The lower chuck is then untightened, and the blade is pulled out and is inserted through another hole for the next cut. The lower end of the blade is then fastened to the lower chuck and the plunger is forced down by hand until the upper end of the blade enters the upper chuck. Finally, while so holding the plunger with one hand, the upper chuck is tightened by the other hand.

It is apparent that this sequence of operations is tedious and time consuming.

Accordingly, an object of the present invention is to provide a scroll saw wherein the foregoing difficulties and objections are eliminated.

Another object is to provide a scroll saw wherein the positioning of the saw blade in making interior cuts is greatly facilitated.

Another object is to provide a tension sleeve for scroll saws arranged to readily enable the saw blade to be withdrawn from the work table opening and an interior cut and be reloacted for the next interior cut without removing the saw blade from the upper chuck.

A further object is to provide means for automatically withdrawing the saw blade upon untightening of the upper and lower chucks.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification wherein:

Fig. 1 is a fragmentary elevational view, partly in section, of a scroll saw in accordance with the invention.

Fig. 2 is a sectional view taken along the line 2—2 on Fig. 1.

Figs. 3, 4 and 5 are schematic sectional views illustrating the manner in which the saw blade is withdrawn and relocated in making successive interior cuts.

Fig. 6 is an enlarged sectional view of the blade holder shown in Fig. 2.

Fig. 7 is a sectional view taken along the line 7—7 on Fig. 6.

Fig. 8 is a perspective view of another form of blade holder.

Fig. 9 is a longitudinal sectional view of the holder shown in Fig. 8.

Fig. 10 is a perspective view of still another form of blade holder.

Fig. 11 is a longitudinal sectional view of the holder shown in Fig. 10.

Referring to the drawings in detail and more particularly to Figs. 1 and 2 thereof, a portion of a scroll saw machine is shown illustrating the elements with which the present invention is concerned. These elements include a work table 10 formed with an opening 11 for supporting the work W, a lower chuck 12 adapted to be reciprocated by a conventional drive (not shown), a saw blade 13 extending through the table opening 11 having its lower end secured to the chuck 12, and a tension sleeve device 14 attached to a support 15.

The tension device 14 is conventional in that it comprises a sleeve 16, a closure 17 at the lower end of the sleeve formed with a central bearing opening 18 and a flange 19 within the sleeve, a plunger 20 slidable within the bearing opening having a flange 21 at the upper end, an upper chuck 22 at the lower end of the plunger to which the upper end of the saw blade is fastened, a tension spring 23 between the flanges 19 and 21 for urging the plunger upwardly to tension the saw blade, and a closure 24 for the upper end of the sleeve.

The plunger 20 is formed with a guideway and for this purpose it preferably consists of a tube having an opening or bore 25 extending therethrough. The upper chuck 22 is secured to this tube, as shown, and is conventional except that the blade receiving opening 26 thereof extends completely therethrough to enable the blade to pass upwardly within the plunger.

In accordance with the invention, an element 27, characterized as a blade holder, is slidably mounted on the guideway, that is, in the bore 25 as shown herein. The blade holder has the upper end of the saw blade 13 secured thereto and normally is disposed at the lower end of the plunger bore 18 adjacent the upper chuck 22. Several forms of such holders will be described hereinafter.

When the upper and lower chucks are operated to release the blade, the holder 27 is adapted to be moved upwardly in the bore and carry the blade therewith to retract the blade in the manner about to be described. This may be accomplished manually or by means which are automatic, such as a relatively light tension spring 28 having its lower end attached to the holder 27 and having its upper end attached to a disc 29 supported on the flange 21, for example, by a hook 30.

The improvements, as described so far, are readily embodied in new machines or many types of conventional machines already in use.

The manner of withdrawing the saw blade and relocating the same is illustrated in Figs. 3, 4 and 5, the lower chuck 12 being in its extreme upper position throughout.

As shown in Fig. 3, when the lower and upper chucks are operated to release the saw blade, the saw blade is retracted to withdraw the lower end thereof from the hole in the work piece W and the table opening 11.

After the next work hole is placed above the table opening, the saw blade is pulled down by hand until the blade holder 27 abuts the upper chuck 22, as shown in Fig. 4, and the lower end of the blade enters the lower chuck 12. The upper chuck is then tightened to secure the blade in this position.

Thereafter, the plunger 20 is moved downwardly to compress the spring 23 and the lower chuck 12 is tightened to arrange the saw blade for succeeding operations, as shown in Fig. 5.

In order to facilitate entry of the lower end of the saw blade into the lower chuck 12 without manual assistance, the present invention contemplates modifying the lower chuck by providing a flared or upwardly diverging opening for guiding the clamping saw blade into the clamping means of the chuck. For example, as shown in Fig. 2, a conventional lower chuck, including a sleeve 31 formed with a blade opening 32, and a wing screw 33 threaded into the sleeve and extending to the opening, can be equipped with this improvement by mounting a head 34 formed with the aforementioned guide opening 35 on the upper end of the sleeve and securing the head to the sleeve by means of the wing screw 33.

In Figs. 6 and 7, a blade holder 27 is shown which comprises a body 36 formed with a saw blade receiving slit 37 at its lower end, a set screw 38 within the body for clamping the blade, and a hook 39 at the upper end of the body for connecting the lower end of the spring 28. A hole 37' in alignment with a left edge of the slit 37 and extending upwardly, as seen in Fig. 6, is preferably provided for centering fine blades, coarser blades being readily centered in the slit 37. Thus, when a fine blade is used, it is raised beyond the slit 37 and into the centering hole 37', after which it is secured by the set screw 38.

In Figs. 8 and 9, a blade holder is shown which comprises a metal strap bent to form a body 40 and a pair of tabs 41 above the body. The saw blade extends through a hole 42 in the lower part of the body and a screw 43 extends through holes 44 in the tabs and a hole in the saw blade which extends between the tabs and is fastened thereto. A hook 45 extends through holes 46 in the tabs for connecting the spring 28.

In Figs. 10 and 11, a blade holder is shown which comprises a body 47 formed with a saw blade receiving slit 48 at its lower end and with a flat surface 49 out of alignment with the slit 48, a clamping plate 50, and a screw 51 for securing the plate against the surface 49 to clamp the blade in position. A hook 52 extends through a hole 53 in the plate at its upper end for connecting the spring 28.

From the foregoing description, it will be seen that the present invention provides novel and useful improvements particularly adapted for scroll saw machines. This is accomplished in a practical, economical and convenient manner.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a scroll saw, the combination of a normally vertical plunger having a guideway, an element slidable in said guideway, means for attaching an end of a saw blade to said element, means at the lower end of said plunger for releasably securing the saw blade for movement with said plunger and normally holding said element adjacent the lower end of said plunger, and means for moving said element and the saw blade upwardly when the saw blade is released from said plunger.

2. In a scroll saw according to claim 1, wherein said last mentioned means is a tension spring.

3. In a scroll saw according to claim 2, wherein one end of said spring is attached to said element and the other end of said spring is attached to said plunger adjacent the upper end thereof.

4. In a scroll saw, the combination of a normally vertical plunger including a tubular member, an element slidable in said member, means for attaching an end of a saw blade to said element, means at the lower end of said plunger for releasably securing the saw blade for movement with said plunger and normally holding said element adjacent the lower end of said tubular member, and means for moving said element and the saw blade upwardly within said tubular member when the saw blade is released from said plunger.

5. In a scroll saw according to claim 4, wherein said last mentioned means is a tension spring having one end secured to said element and having its other end secured to said tubular member adjacent the upper end thereof.

6. In a scroll saw, the combination of a plunger including a normally vertical tube, a chuck on said tube at the lower end thereof including an opening through which a saw blade is adapted to pass and means for releasably clamping the saw blade within said opening, a saw blade holder slidable in said tube including means for attaching the saw blade thereto and normally positioned adjacently above said chuck, and means for moving said holder and the saw blade attached thereto upwardly within said tube when the saw blade is released from said chuck.

7. In a scroll saw according to claim 6, wherein said last mentioned means is a tension spring having one end attached to said tube adjacent the upper end thereof and said saw blade holder has a hook at its upper end for attaching the other end of said spring.

8. In a scroll saw, the combination of a hollow plunger having a guideway, a saw blade holder slidable in said guideway, means for securing an end portion of a saw blade to said holder, and a chuck at the lower end of said plunger for securing an intermediate portion of said saw blade for movement with said plunger.

9. In a scroll saw, the combination of a plunger including a normally vertical tube, a chuck on said tube at the lower end thereof having an opening through which a saw blade is adapted to pass, means for releasably clamping the saw blade within said opening, a saw blade holder slidable in said tube normally positioned adjacently above said chuck, said holder having a slit for reception of the upper end of said saw blade, means for attaching the saw blade to the holder, and means for moving said holder and the saw blade attached thereto upwardly within said tube when the saw blade is released from said chuck.

10. In a scroll saw according to claim 9, wherein said saw blade holder has a hole upwardly in continuation of said slit for centering comparatively fine blades.

References Cited in the file of this patent

UNITED STATES PATENTS

| 1,877,705 | Tautz | Sept. 13, 1932 |
| 1,964,651 | Tautz | June 26, 1934 |
| 2,049,191 | Bouget et al. | July 28, 1936 |
| 2,519,214 | Angelotti | Aug. 15, 1950 |

FOREIGN PATENTS

| 108,981 | Switzerland | Feb. 16, 1925 |
| 411,927 | Great Britain | June 21, 1934 |